US008725816B2

(12) United States Patent
Lee et al.

(10) Patent No.: US 8,725,816 B2
(45) Date of Patent: May 13, 2014

(54) PROGRAM GUIDE BASED ON SHARING PERSONAL COMMENTS ABOUT MULTIMEDIA CONTENT

(75) Inventors: David D. Lee, Palo Alto, CA (US); Jaegeun Lim, Seoul (KR); Dongcheol Jeong, Seoul (KR); Youngwoon Yoon, Seoul (KR)

(73) Assignee: VMTV, Inc., Palo Alto, CA (US)

( * ) Notice: Subject to any disclaimer, the term of this patent is extended or adjusted under 35 U.S.C. 154(b) by 34 days.

(21) Appl. No.: 13/100,105

(22) Filed: May 3, 2011

(65) Prior Publication Data

US 2012/0284343 A1 Nov. 8, 2012

(51) Int. Cl.
*G06F 15/16* (2006.01)

(52) U.S. Cl.
USPC .......................................... 709/206; 709/204

(58) Field of Classification Search
USPC ................................................ 709/204, 206
See application file for complete search history.

(56) References Cited

U.S. PATENT DOCUMENTS

| | | | | |
|---|---|---|---|---|
| 7,548,565 | B2 | 6/2009 | Sull et al. | |
| 7,624,337 | B2 | 11/2009 | Sull et al. | |
| 2003/0041092 | A1 | 2/2003 | Woo | |
| 2010/0242074 | A1 * | 9/2010 | Rouse et al. | 725/100 |
| 2013/0006602 | A1 | 1/2013 | Zhu et al. | |

FOREIGN PATENT DOCUMENTS

| | | | |
|---|---|---|---|
| JP | 2004-177712 | A | 6/2004 |
| JP | 2006-174414 | A | 6/2006 |
| KR | 10-2009-0112879 | A | 10/2009 |

OTHER PUBLICATIONS

PCT International Search Report and Written Opinion, PCT Application No. PCT/US2012/036016, Nov. 16, 2012, 9 pages.
United States Office Action, U.S. Appl. No. 13/601,874, Jan. 17, 2014, 8 pages.

* cited by examiner

*Primary Examiner* — Adnan Mirza
(74) *Attorney, Agent, or Firm* — Fenwick & West LLP

(57) ABSTRACT

Members of a social network service may share real-time comments about multimedia content they are viewing. The comments are attached to bookmarks that allow other members to view the video and add to the discussion thread.

35 Claims, 11 Drawing Sheets

PROGRAM GUIDE BASED ON SHARING PERSONAL COMMENTS ABOUT MULTIMEDIA CONTENT

BACKGROUND OF THE INVENTION

1. Field of the Invention

This invention relates generally to sharing personal information about multimedia content, including for example using other people's comments about videos as a basis for a personalized program guide to videos.

2. Description of the Related Art

For many years, television was the dominant form of easily accessible multimedia. As such, it often formed the center of social activities. In the early days of television when not every household contained a television, multiple households might meet at a certain time at a certain place (the place with the television) in order for everyone to watch a certain television program. This behavior was driven by technological constraints. There was only one television and the television program could only be viewed at one specific time determined by the broadcaster.

Advances in technology have essentially removed these constraints. Televisions are now so inexpensive as to be ubiquitous and programming can be viewed on many devices, not just televisions. Furthermore, time-shifting technologies now allow broadcast programming to be recorded and viewed at any later time. Many other types of programming can simply be accessed at any time. Today, it is not uncommon for every person to have personal gadgets for accessing and viewing many different types of multimedia content, not just television, at all times. Thus, it is not uncommon for members of today's household to all be in the same room, but with each member viewing his/her own program on his/her own device. This is in stark contrast to the behavior from long ago. Thus, one might conclude that the behavior of sharing a video-viewing experience is now obsolete, since advances in technology have removed the constraints that in the past forced this behavior.

However, the technological constraints were only one aspect driving the behavior. People often enjoy gathering together to share a video experience. For example, shared viewing experiences happen today, even though they are not forced by technological limitations. A group of friends or floormates within a college dormitory might meet regularly to watch a weekly television series. As another example, sports fans might gather at a local sports bar in order to cheer on their favorite team. This happens not because there is only one television that must be shared; it happens because people enjoy sharing the experience.

However, it is difficult to reproduce a similar experience for people who are connected virtually. Returning to the household example, the daughter might be watching a different program than her parents and siblings, but she might be watching the same program as her friends across town (who are also watching on their devices from their homes) and she might enjoy sharing that experience even though she cannot physically meet with her friends. Thus, there is a need for technology to allow people to do so.

SUMMARY OF THE INVENTION

The present invention overcomes the limitations of the prior art by allowing members of a social network service to share real-time comments about multimedia content they are viewing. The comments are attached to bookmarks, which can be used by other members to view the video and add to the discussion thread.

In one aspect, the following occurs in real-time as member(s) are viewing multimedia content. The viewing members can share their comments about the video with other members, including those who are not viewing the content. The sharing includes bookmarks that mark corresponding time points in the content. Thus, if one member makes a comment about scene 14, his comment is shared with a bookmark for scene 14. Other members can use the bookmark to start viewing the content or to jump to different points in the content if they are already viewing. In this way, members can share the experience of viewing the content without having to be in the same physical location.

The comments and bookmarks preferably are organized into discussion threads. The discussion threads can be saved and then used for subsequent searching. Thus, they can form a sort of personalized program guide. Rather than looking at the electronic program guide provided by the local cable company, a member might search through the comments and recommendations made by his friends. In another aspect, anonymized or aggregated information (including trending data) is published to a wider audience.

Other aspects of the invention include methods, devices and systems related to the approaches described above, as well as specific implementations of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
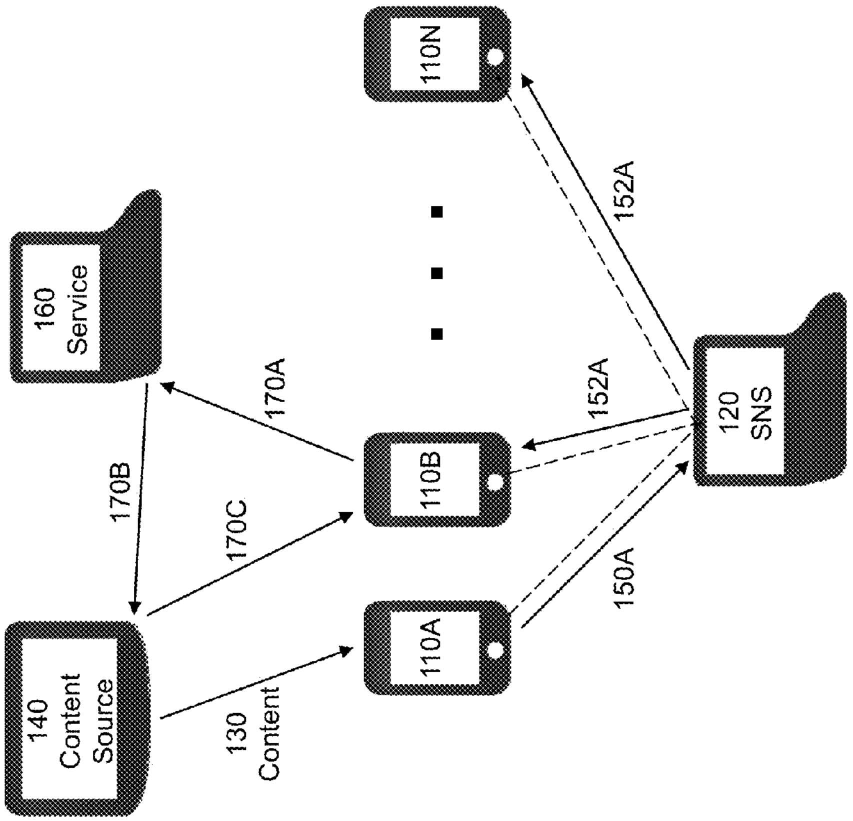
FIG. 1 is a block diagram of a system according to the present invention.

FIG. 1 is a block diagram a system according to the present invention. In FIG. 1, a member 110A of a social network service (SNS 120) is viewing multimedia content 130 from source 140. For example, the member 110A might be watching a broadcast television program. While the member 110A is viewing the content 130, he makes comments 150A about the content 130. He might like or dislike certain parts; he might notice things about the scenery, plot or characters; he could make any types of comments. These comments 150A are shared with other members 110B-N according to the privacy rules for the SNS. The dashed lines in FIG. 1 indicate members of the SNS 120.

However, the comments 150A are not simply forwarded to other members. Rather, the comments 150A are attached to bookmarks that mark corresponding time points in the content 130. For example, the bookmarks might be thumbnails of the corresponding frames in the television program. The bookmarks can come from different sources. For example, they might be provided by the source 140 along with the content 130. Alternately, they might be generated by the member's viewing device as he is viewing the content 130. In another approach, the bookmarks might be provided by a separate service 160. This bookmarking service may also be referred to as a dynamic metadata service, because it can provide and/or organize metadata beyond just bookmarks. The comments and bookmarks (collectively, referred to as a discussion thread 152A) are forwarded to other members 110B-N.

Upon viewing the comments, other members 110B-N may want to also view the content 130. If they are already viewing the content, they may want to skip to the sequence that was commented on. In either case, they can do so by activating the bookmark. In FIG. 1A, member 110B activates the bookmark. This triggers a sequence of events 170A-C. The metadata service 160 translates the bookmark to a corresponding time point for the content 130. It instructs 170B the source 140 to provide 170C the content 130 to member 110B beginning at that time point. Members 110B-N can also provide their own comments and share them with the other members. In this way, members 110 can have a shared viewing experience, even if each member is viewing the content 130 on his/her own device at separate physical locations.

In another aspect, the comments and corresponding bookmarks can be organized into discussion threads for the video. Metadata service 160 stores these discussion threads for subsequent searching by members of the SNS. For example, member 110B might later want to view member 110A's comments about the video, or might want to search for related videos based on member 110A's comments. Public parts of the discussion thread (including aggregate statistics over many members) may also be published more broadly and/or used for searching by a broader public. In this way, a program guide to content can be constructed based on personal comments.

It should be understood that FIG. 1 is just an example and many variations will be apparent. For example, there are many types of multimedia content 130 and many ways to distribute that content. Video is probably the most common form of multimedia content, but other forms can also be accommodated. Video can include live action (sporting events, musical performances, etc.), movies and television programming. It can include live broadcast, broadcast premieres, video on demand and playback of prerecorded video. Distribution channels can include television broadcast, cable and satellite networks, Internet and mobile networks. Accordingly, the source 140 can include television stations, cable and satellite head-ends, Internet sites and a member's local device (e.g., for content that is downloaded onto a member's device and then played back later).

The actual devices used can also vary, even from member to member. First, the device used to view content, activate video bookmarks and share comments could be the same device, but they do not have to be. For example, a member might be watching a television program on his high definition TV but might be social networking via his mobile device (e.g., phone, tablet, pad), with the two activities synchronized. On the other hand, another member might be watching the television program and social networking from a single integrated window running on his laptop computer. Viewing devices include devices supported by the content source 140, including televisions, computers and phones and other mobile devices. Similarly, social networking devices include devices supported by the SNS 120. Common social networking services include Facebook, Twitter, and other forms of instant messaging.

As a final example, the functions provided by the member devices 110, source 140, SNS 120 and metadata service 160 can be allocated in different ways. As described above, the bookmarks can be provided by any of these devices. As another example, rather than notifying 170B the source 140 to start playback of content for a member 110B, the metadata service 160 might initiate playback by sending a message to the member 110B which then gets the appropriate content from the source 140. With respect to SNS 120, the SNS 120 is the source of privacy rules for the members 110, so communications between the members 110 and source 140 or service 160 could run through the SNS 120 rather than occurring directly. Conversely, SNS functions such as privacy controls could be implemented at least in part by the source 140 or service 160.

Figure 2:
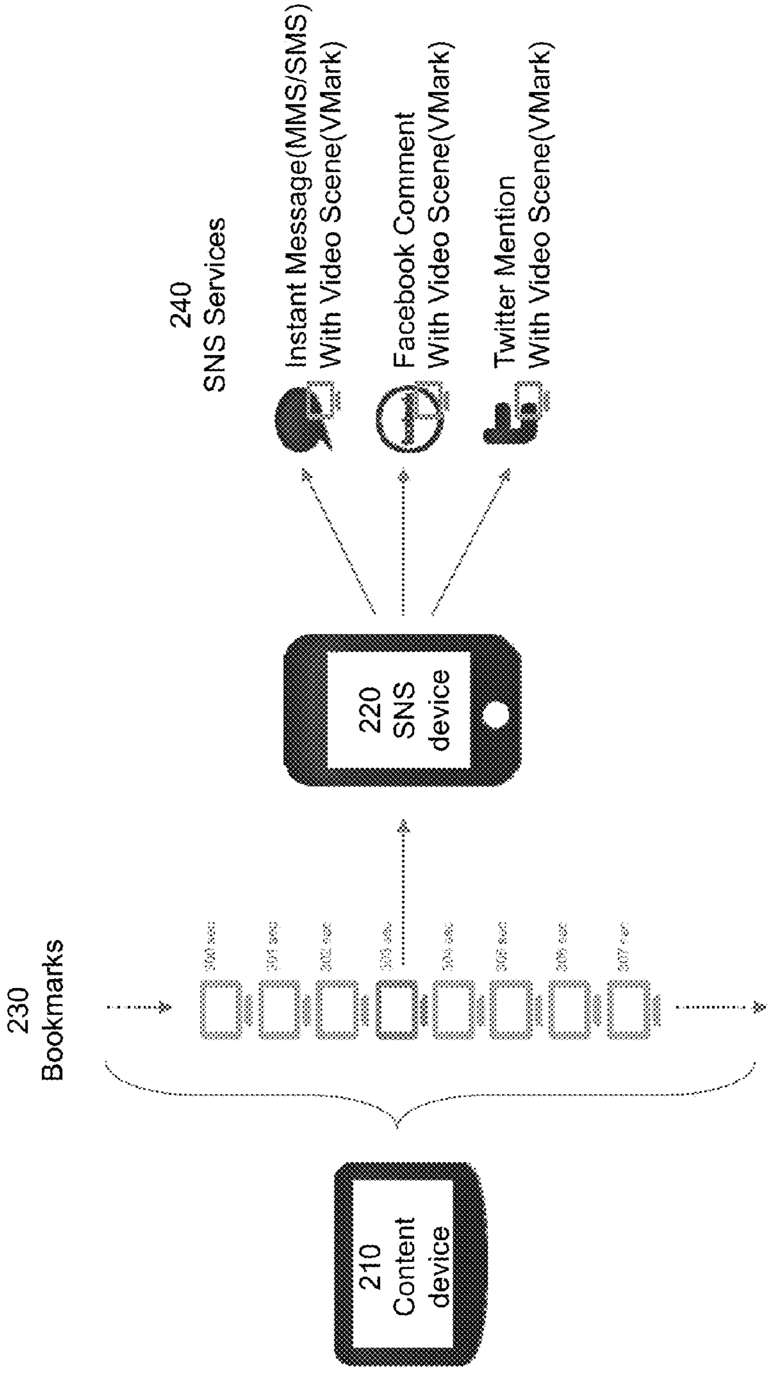
FIG. 2 is a diagram illustrating a member commenting on a video he is viewing.
Figure 3:
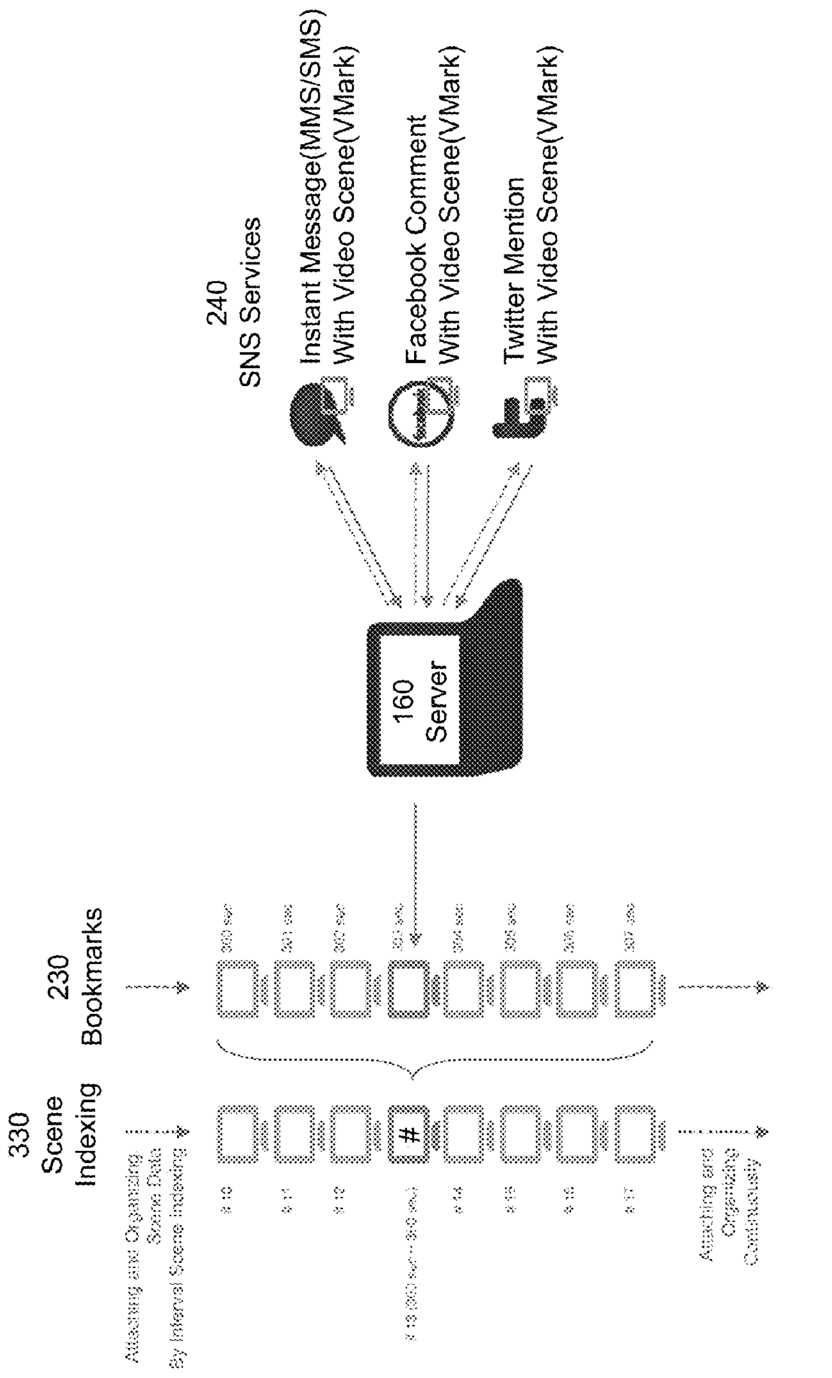
FIG. 3 is a diagram illustrating organizing member comments by scene.
Figure 4:
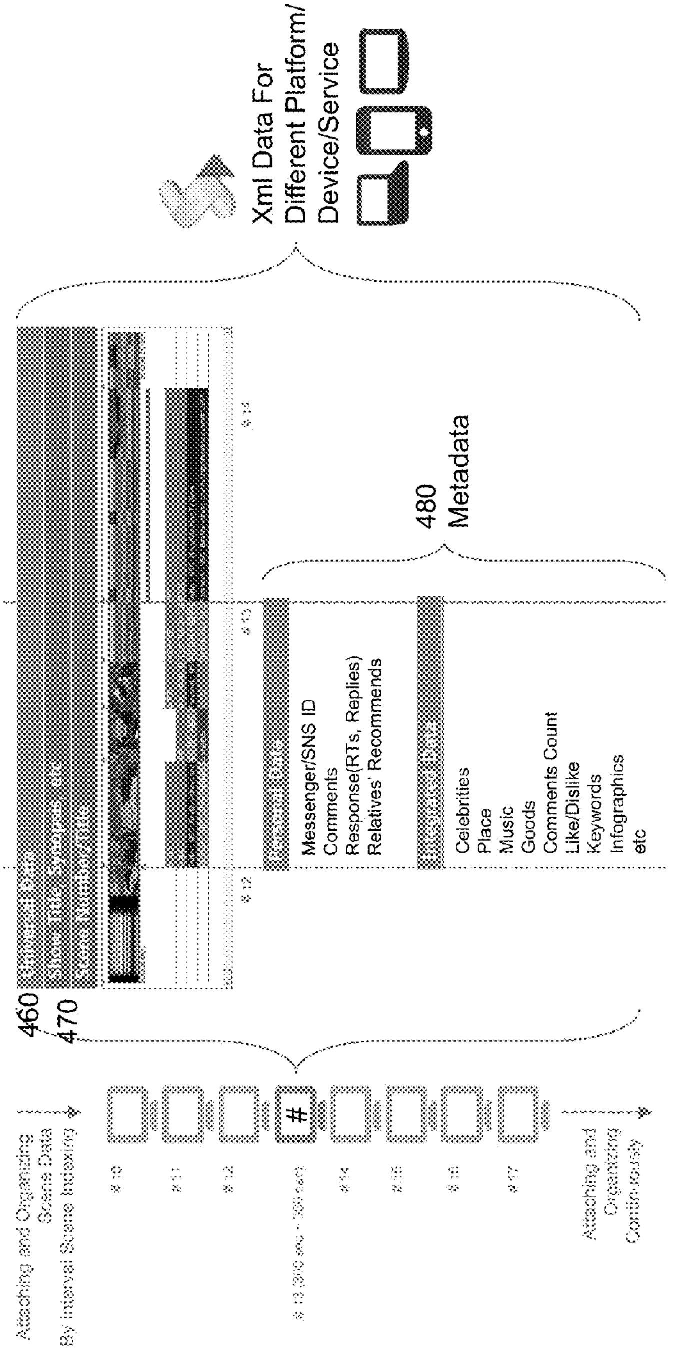
FIG. 4 shows an example discussion thread.

FIGS. 2-4 provide a more detailed example of one implementation. In FIG. 2, a member is commenting on a video he is viewing. In this example, the member is viewing a video on one device 210 and is social networking on another device 220. The video is a live broadcast of an event that is being streamed to the device 210. There is one video bookmark 230 for each second of content. The video bookmarks 230 are provided to the SNS device 220. The bookmarks 230 and video are synchronized. That is, the video bookmark for second 303 is provided to the SNS device 220 at the same time that second 303 is playing on the content device 210. The member can share comments 240 via various SNS. The comments are attached to the video bookmarks (annotated as VMark in FIG. 2). The comments (with VMarks) are shared with other members, who can then also view the video by activating the bookmarks.

FIG. 3 illustrates the organization of comments. Comments 240 are received by the metadata service 160. The service 160 associates the comments 240 with the corresponding time point in the video. In this example, comments are further aggregated by scene 330. For example, seconds 300 to 360 in the video might all correspond to scene 13.

FIG. 4 shows an example organization of this information for scene 13. Sections 460 and 470 contain non-personal metadata about the show. These items could include title, summary, year of release, actors, sex/language/violence rating, video source and other bibliographic information. This can be provided for the entire video or might vary from scene to scene. Actor information could list just the actors appearing in that scene. Other scene information could include setting and background music.

Section 480 includes comments organized for this scene. This data includes personal data such as the actual comments and responses and SNS profile for the commenters. It can also include data that has been anonymized or aggregated so that it can be published to a broader audience. In this example, metadata service 160 organizes, stores and makes this data 480 available to others. Thus, SNS 120 might access the metadata service 160 in order to share comments within groups of members, and more public search engines might catalog the public parts of this data to provide more general searching. In this way, the data collected by metadata service 160 can provide a guide to different types of programming—a personalized program guide of sorts. As shown in FIG. 4, the data preferably is provided in different forms matched to the member's device.

By searching, sorting and reviewing the metadata attached to a scene or a video, a member can learn more about the scene or video and decide whether to view it. For example, a member might search for comments from certain members or a group of members (e.g., his friends) and review these comments to learn about the video. The metadata can be searched or organized in different ways: according to which member is making the comment, according to which members are receiving the comments, according to which members are/have viewed the video, according to content of the comments, by video bookmark, or by level of recommendation (e.g., like/dislike), to name a few. If a member selects a video, he can then add his own comments to the discussion thread. In this way, a rich data set can be built up over time.

Various architectures can be used to implement a metadata service on a computer system. For example see U.S. Pat. No. 7,624,337 "System and Method for Indexing, Searching, Identifying and Editing Portions of Electronic Multimedia Files" and U.S. Pat. No. 7,548,565 "Method and Apparatus for Fast Metadata Generation, Delivery and Access for Live Broadcast Program," both of which are incorporated herein by reference. In one implementation, specialized software applications run on the various devices to implement the video bookmarking and integrated social networking services. In one approach, these applications are provided by a central source. Alternately, APIs may be defined, thus allowing third parties to develop many different versions of these applications. Preferably, the user experience is somewhat standardized so that users can easily use these applications, regardless of which device and which version of the application. In one approach, the metadata service controls and distributes the APIs.

Aggregate data or time-based data can also be presented. For example, trending information might indicate that certain groups of members feel a television show is getting better/worse with each passing episode, or that certain sections within a movie are exciting/boring. Trend setters can use the service to establish followings for new programs.

Figure 5:
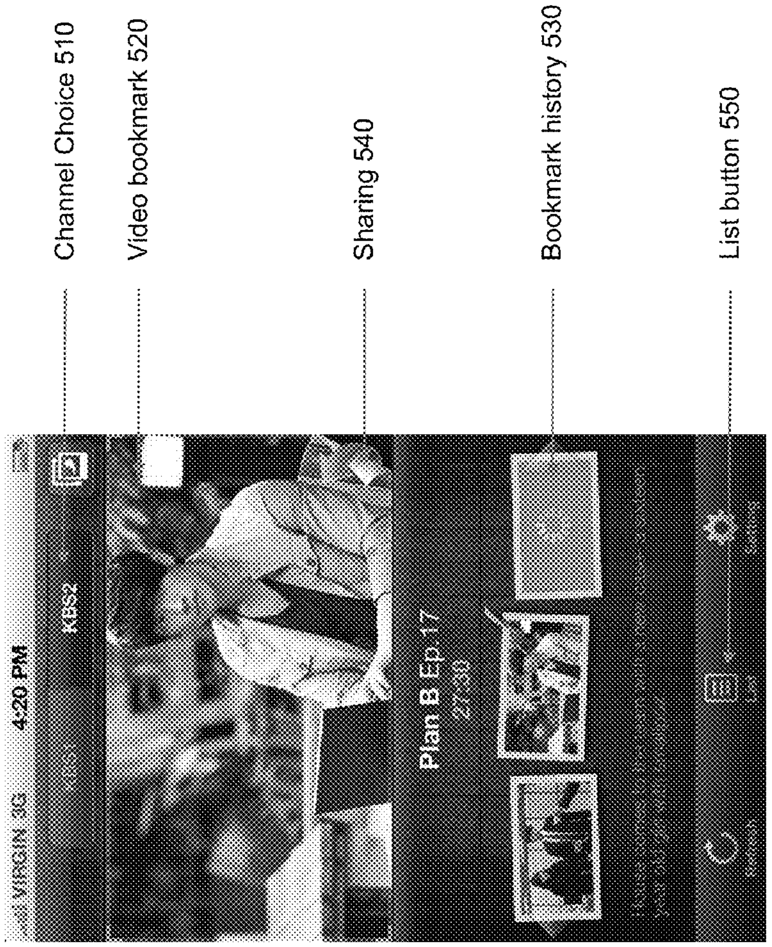
FIG. 5 is a screen shot of a main user interface page according to the present invention.

FIGS. 5-9 show screen shots of another implementation. In this example, a member is watching a television program on his television, from broadcast TV station KBS2. At the same time, the member is social networking on a separate mobile device. FIG. 5 is a screen shot of the member's SNS device. The channel choice 510 shows which channel the member is tuned to on his television. In this example, there are two possible channels, KBS1 and KBS2, and the user is watching KBS2. The video bookmark 520 is the bookmark that corresponds to what is currently airing on KBS2. It changes as the television program proceeds. Section 530 shows a history of video bookmarks, showing the current bookmark as well as past bookmarks. In this way, the member can make comments on prior scenes by scrolling back to past bookmarks.

Figure 6:
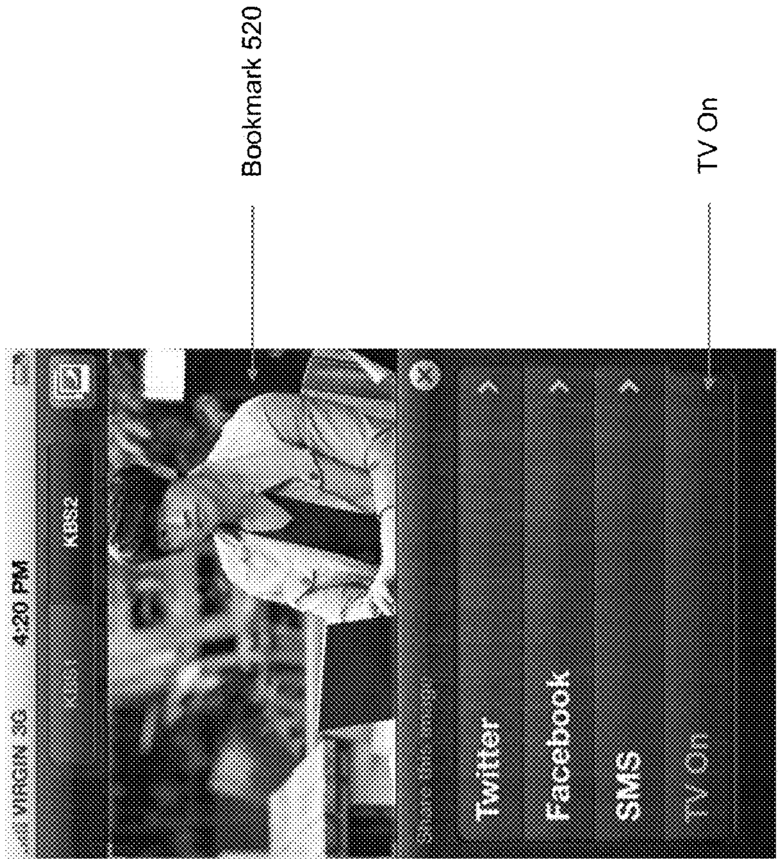
FIG. 6 is a screen shot of a page for sharing comments.

The member can share comments by clicking the sharing arrow 540. FIG. 6 shows the screen after the sharing arrow 540 has been activated. This version of software brings up possible SNS services (Twitter, Facebook and SMS), to make it easy for the member to share the video bookmark 520. The member can also make comments before sharing the bookmark. The "TV on" button can be used to turn on the TV, for example tuning it to the broadcasting channel or start playing recorded/stored video according to the current video bookmark.

Figure 7:
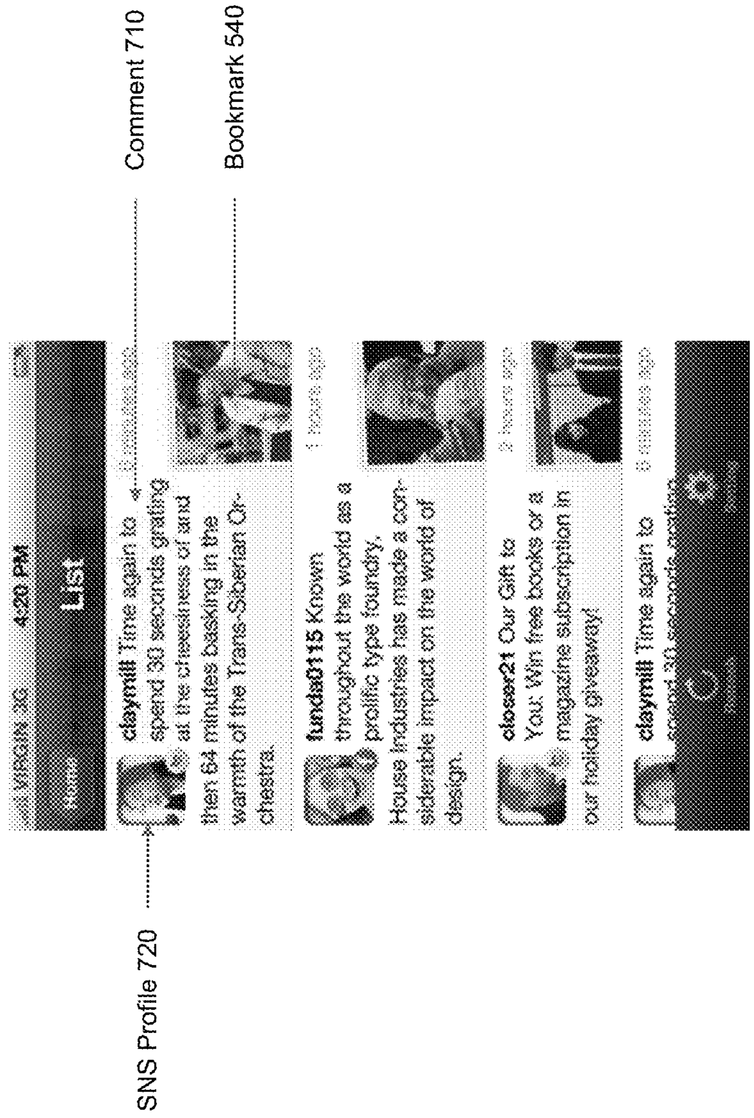
FIG. 7 is a screen shot of a listing of shared comments.
Figure 8:
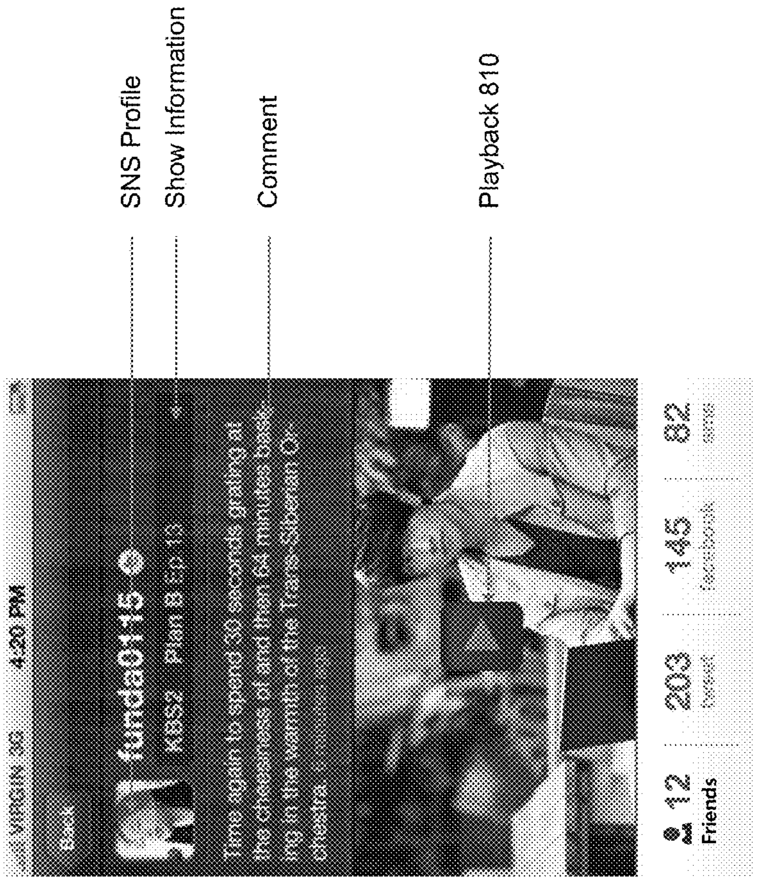
FIG. 8 is a screen shot of a page for activating a video.

The List button 550 in FIG. 5 displays a list of past comments. FIG. 7 shows the screen after the List button is clicked. In this particular display, each entry in the list includes a comment 710, the corresponding bookmark 540, and the SNS profile 720 of the member making the comment. By activating the bookmark 540, the member can bring up more information and eventually start playback of the corresponding video. FIG. 8 shows the screen after a member has activated bookmark 540. In this example, the comment 710 and SNS profile 720 are displayed. Some additional information is provided about the program, as well as about the social networking aspects as shown at the bottom of this screen. In this example, there have been 203 tweets or retweets of this comment, 145 facebook comments or like/dislike actions, and 82 sms (short message service) messages using this video bookmark. These are generally showing quick social media statistics about the video bookmarks. Video playback can be started by clicking the Play triangle 810. The playback preferably is matched to the member's playback device. For example, different screen formats and resolutions might be used for playback on a high definition TV versus a small screen mobile phone. In fact, the playback does not have to be video. For example, it could be teletext. If the video is a newscast, the member might prefer teletext rather than full video.

Figure 9:
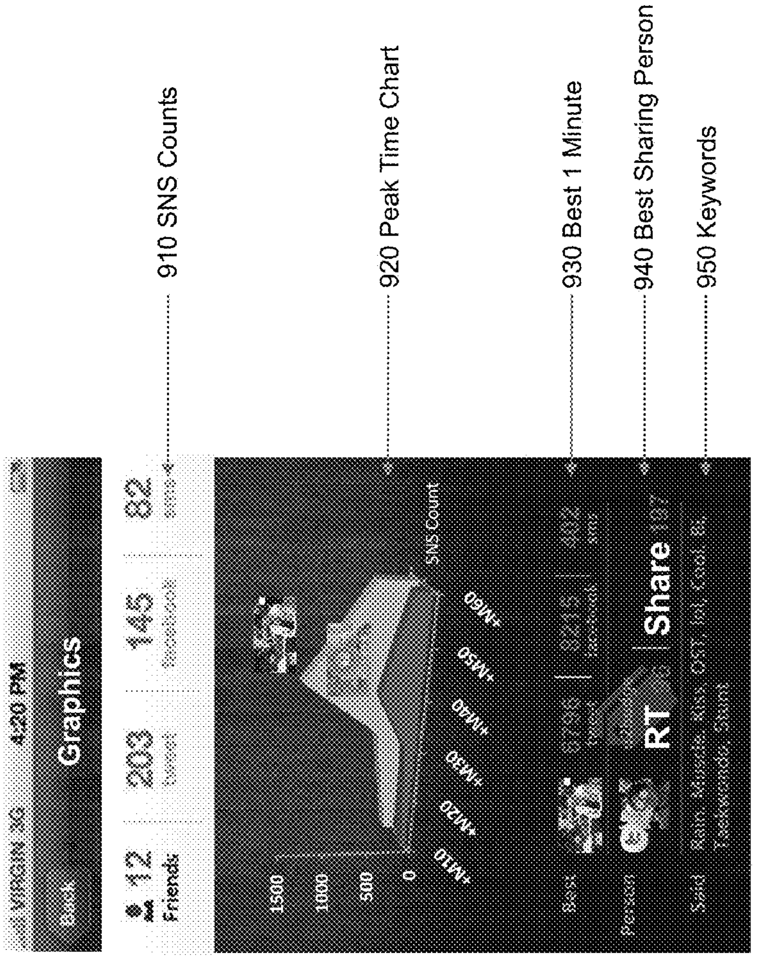
FIG. 9 is a screen shot for a sharing dashboard.

FIG. 9 shows a sharing dashboard. The SNS counts 910 show the number of messages or mentions shared about the video or video bookmark within the same video by Twitter friends (tweets), Facebook friends (facebook), or by friends' SMS or MMS (sms). The Friend's count (Friends) shows the count of the unique users' or friends' IDs in the SNS shared count. The Peak Time Chart 920 has two graphs that show the SNS shared counts (top) and SNS Friend's count (bottom) vs. time lapsed from the beginning of the video. The Best row 930 indicates which time point is considered the best by the community (e.g., the most shared scene within the video). The thumbnail is the video bookmark for the best time point, and the numbers indicate the total messages or mentions by each SNS (tweet, facebook, and sms). The Person row 940 indicates the SNS ID whose video bookmarks or messages are used most by other friends by retweets (RT) or video playback counts (Share). This could be used for rewarding for those who actively send video bookmarks for example. The Said row 950 indicates which words are occurring most frequently in the members' comments. These keywords are saved as metadata and can be used for search and linking dynamic advertising.

Figure 10:
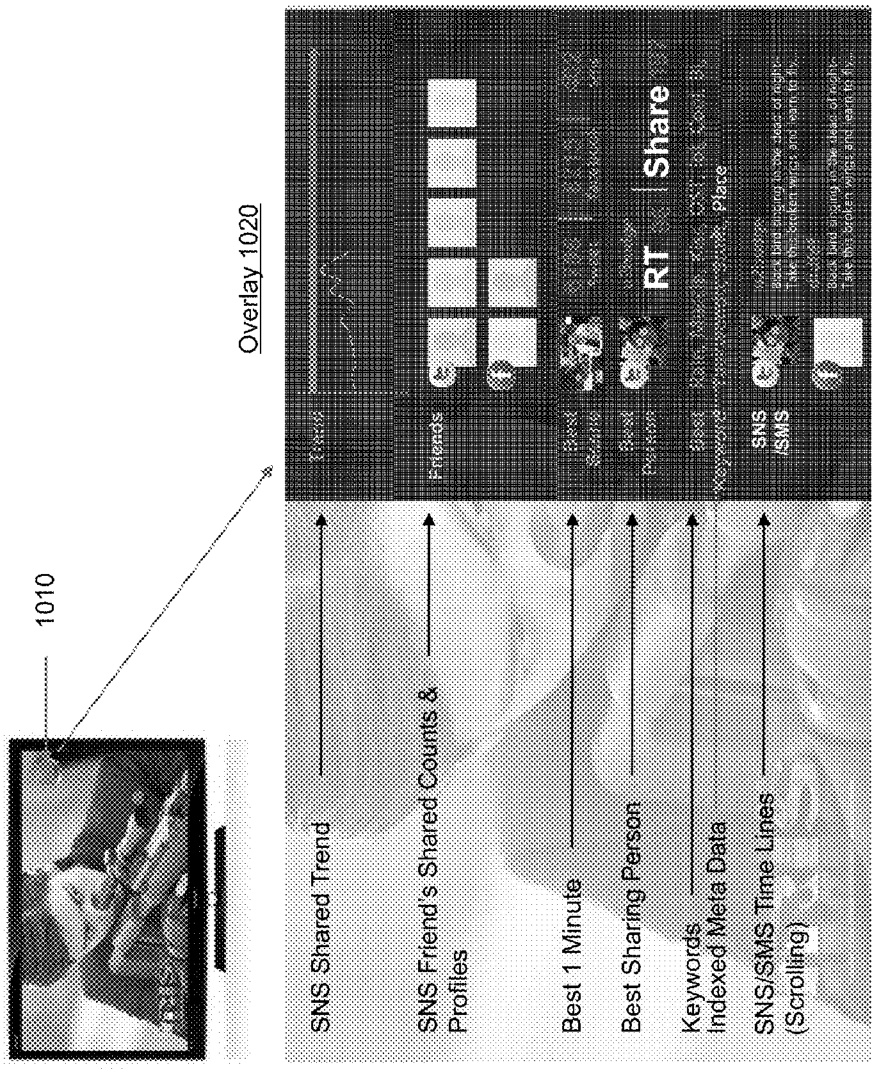
FIG. 10 illustrates another example embodiment according to the present invention.

FIG. 10 shows another example implemented on an Internet-ready TV. In this example, a television program is playing on the TV. However, the TV has a user interface button 1010. When activated, the button overlays a sharing dashboard 1020. The listing of member comments is located at the bottom of the dashboard. The other information is similar to information shown in FIGS. 5-9. In an alternate implementation, the user interface button is not shown on the TV screen, but might be a button on a remote control for example.

Figure 11:
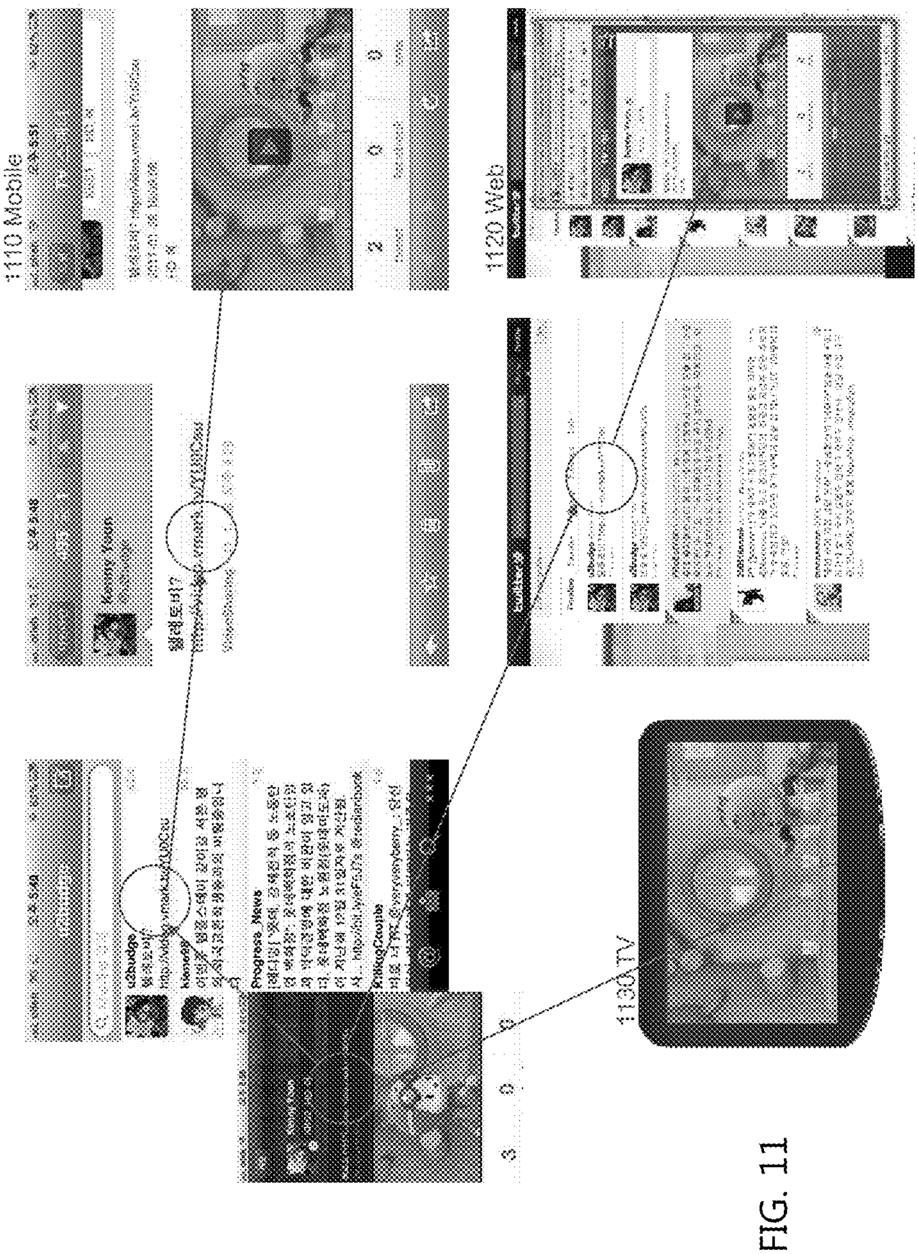
FIG. 11 illustrates distribution of a video bookmark to different devices.

FIG. 11 illustrates distribution of a video bookmark, with playback on different devices. In this example, a user creates a video bookmark, which can be activated for playback on a mobile device 1110, on a web browser on a personal computer 1120, or on a television 1130. In response to clicking the video bookmark, the video bookmark service leads the user to the corresponding source that has the right format for the user's desired device of video playback. For example, mobile servers may have multimedia files optimized for mobile screens, and TV or PC servers may have a multimedia files for high resolution HDTVs.

Although the detailed description contains many specifics, these should not be construed as limiting the scope of the invention but merely as illustrating different examples and aspects of the invention. It should be appreciated that the scope of the invention includes other embodiments not discussed in detail above. For example, the video bookmark may take different forms and contain different amounts of information. In one example, video bookmark itself may contain the actual text from the video. This is especially useful for news segments. When users cannot access the SNS or video source, they can read the text contained in the video bookmark. TV stations sends out such text information during broadcasting via teletext format and the metadata service can capture the text and attach it to the video bookmarks automatically. This view of text can also generate rapid viral spread of the message/bookmarks, which in turn can generate more video playbacks—i.e. enhance rating of the video.

In another aspect, the video bookmark or the metadata service may be used to change the programming channel. As an example, in a situation where a user is watching video on a TV and social networking on a mobile device, activating a video bookmark on the mobile device may automatically change the channel on the TV to the selected program. The video bookmark may also be used to locate the multimedia file within locally connected home consumer electronics devices such as a DVR (Digital Video Recorder) or NAS (Network Attached Storage), to retransmit or broadcast certain comments to a broader audience (e.g., a producer, actor/actress, or reporter of certain video may want to let a broad audience know about their content prior to broadcasting or afterwards to increase both real-time and time-shifted ratings), or to use certain thread/comments in related advertising commercials. In alternate embodiments, the pointer to the multimedia content could be solely the web address or location of the video (i.e., without thumbnail and additional other information). The pointer or video bookmark could also point to a short video clip or other intermediate content, which in turn leads to the full multimedia content.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for sharing video between members of a social network service (SNS), the method comprising:

in real-time while one or more member(s) of an existing Internet-based social network service are each viewing a video:

receiving comments about the video from the viewing member(s);

organizing the comments into a discussion thread for the video, the discussion thread further comprising video bookmarks, wherein the comments are attached to video bookmarks and each video bookmark comprises a frame of the video that marks a time point in the video corresponding to the comment, the video bookmarks enabling playback of the video in different formats on different devices; and sharing the discussion thread with members of the social network service according to privacy rules for the social network service, wherein members can join or modify their viewing of the video by activating video bookmarks and can provide further comments to the discussion thread;

storing the discussion thread for subsequent searching; and publishing public parts of the discussion thread for subsequent searching, wherein the video bookmarks can be further shared with members of a second existing Internet-based social network service according to privacy rules for the second social network service.

2. The method of claim 1 further comprising:

after the members who created the discussion thread have completed their viewing of the video and after the discussion thread has been published:

receiving additional comments from members viewing the video; and adding the comments to the discussion thread.

3. The method of claim 1 wherein the discussion thread further comprises SNS profile information attached to comments in a manner that attributes the comment to the member.

4. The method of claim 1 wherein the discussion thread further comprises non-personal metadata about the video.

5. The method of claim 1 wherein the discussion thread further comprises bibliographic information about the video.

6. The method of claim 5 wherein the bibliographic information comprises any of background music from the video, title of the video, and identity of the source of the video.

7. The method of claim 1 further comprising:
organizing the discussion thread by the members making the comments.

8. The method of claim 1 further comprising:
organizing the discussion thread by the members receiving the comments.

9. The method of claim 1 further comprising:
organizing the discussion thread according to content of the comments.

10. The method of claim 1 further comprising:
organizing the discussion thread by video bookmark.

11. The method of claim 1 further comprising:
organizing the discussion thread by level of recommendation of the comments.

12. The method of claim 1 further comprising:
presenting to the members of the social network service, information concerning member comments about the video.

13. The method of claim 12 wherein said information relates to the volume of comments attached to different time points in the video.

14. The method of claim 12 wherein said information relates to the volume of comments made by different members of the social network service.

15. The method of claim 12 wherein said information relates to a content of the comments.

16. The method of claim 1 further comprising:
aggregating and organizing discussion threads for many videos into a comment-based video guide; and
publishing the video guide.

17. The method of claim 1 wherein at least one member makes comments at a same time and using a same device from which the member is viewing the video.

18. The method of claim 1 wherein at least one member makes comments at a same time but using a different device from which the member is viewing the video.

19. The method of claim 1 wherein at least one member activates video bookmarks from one device and views the video on the same device.

20. The method of claim 1 wherein at least one member activates video bookmarks from one device and views the video on a different device.

21. The method of claim 1 wherein a format of the video changes depending on the device used to view the video.

22. The method of claim 1 wherein the video can be viewed in a teletext format.

23. The method of claim 1 further comprising:
presenting video bookmarks to the member as the member is viewing the video, each video bookmark presented at the corresponding time point in the video, wherein the member selects a video bookmark in order to make a comment attached to that video bookmark.

24. The method of claim 1 further comprising:
presenting SNS button(s) to the member while the member is viewing the video, wherein the member selects an SNS button in order to share the member's comment with members of that social network service.

25. The method of claim 1 wherein the video bookmark is a thumbnail of the video image at the marked time point.

26. The method of claim 25 further comprising:
capturing the thumbnail from the video while the member is viewing the video.

27. The method of claim 25 wherein the thumbnail is captured before the member views and comments on the video.

28. The method of claim 1 wherein the existing Internet-based social network service is Facebook.

29. The method of claim 1 wherein the existing Internet-based social network service is Twitter.

30. The method of claim 1 wherein the comment is an instant message.

31. The method of claim 1 wherein the video is a broadcast of a live event.

32. The method of claim 1 wherein the video is a broadcast of a prerecorded video.

33. The method of claim 1 wherein the video is a broadcast premiere of a prerecorded video.

34. A computer program product for use with a computer, the computer program product comprising a non-transitory computer usable medium having a computer program code embodied therein for sharing video between members of a social network service (SNS), the computer program code performing the steps of:
in real-time while one or more member(s) of an existing Internet-based social network service are each viewing a video:
receiving comments about the video from the viewing member(s);
organizing the comments into a discussion thread for the video, the discussion thread further comprising video bookmarks, wherein the comments are attached to video bookmarks and each video bookmark comprises a frame of the video that marks a time point in the video corresponding to the comment, the video bookmarks enabling playback of the video in different formats on different devices; and
sharing the discussion thread with members of the social network service according to privacy rules for the social network service, wherein members can join or modify their viewing of the video by activating video bookmarks and can provide further comments to the discussion thread;
storing the discussion thread for subsequent searching; and
publishing public parts of the discussion thread for subsequent searching, wherein the video bookmarks can be further shared with members of a second existing Internet-based social network service according to privacy rules for the second social network service.

35. The method of claim 1 wherein the video bookmark comprises timestamps, thumbnails, and metadata identifying scenes in the video corresponding to the comments.

* * * * *